Figure 1:
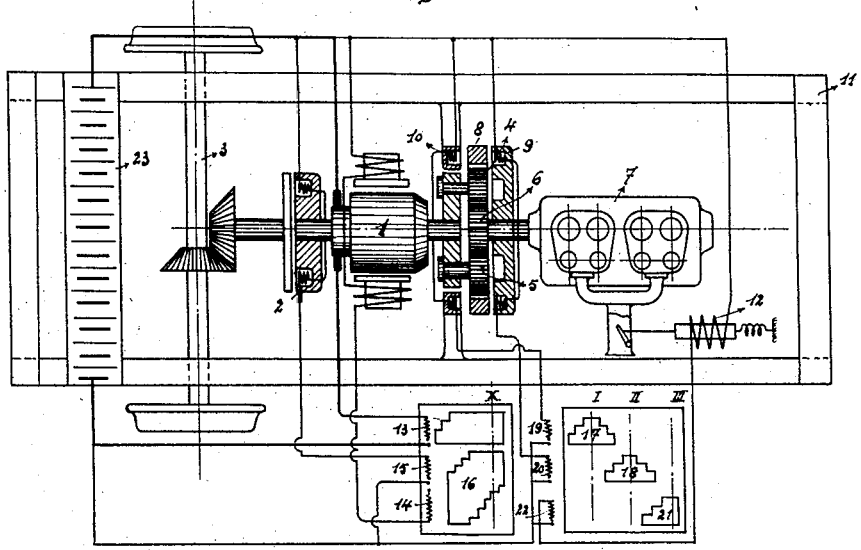

H. PIEPER.
MIXED DRIVING OF VEHICLES.
APPLICATION FILED DEC. 22, 1913.

1,402,250.

Patented Jan. 3, 1922.
2 SHEETS—SHEET 1.

Witnesses:
M. J. Whittaker
G. M. Hulst

Inventor:
Henri Pieper
per
H. H. Tayloom
Attorney.

H. PIEPER.
MIXED DRIVING OF VEHICLES.
APPLICATION FILED DEC. 22, 1913.

1,402,250.

Patented Jan. 3, 1922.
2 SHEETS—SHEET 2.

Witnesses:

Inventor:
Henri Pieper
per
Attorney.

UNITED STATES PATENT OFFICE.

HENRI PIEPER, OF LIEGE, BELGIUM.

MIXED DRIVING OF VEHICLES.

1,402,250.  Specification of Letters Patent.  Patented Jan. 3, 1922.

Application filed December 22, 1913. Serial No. 808,228.

(GRANTED UNDER THE PROVISIONS OF THE ACT OF MARCH 3, 1921, 41 STAT. L., 1313.)

*To all whom it may concern:*

Be it known that I, HENRI PIEPER, a subject of the King of Belgium, residing at Liege, Avenue des Thermes 12, in Belgium, have invented certain new and useful Improvements in and Relating to the Mixed Driving of Vehicles; and I do hereby declare the following to be a full, clear, and exact description of the invention, such as will enable others skilled in the art to which it appertains to make and use the same, reference being had to the accompanying drawings, and to letters or figures of reference marked therein which form a part of this specification.

My invention relates to the mixed driving system, which comprises in combination an explosion or internal combustion engine acting upon the wheels by means of a mechanical power transmission and a dynamo motor which coupled to the heat motor and connected in parallel with a battery serves for buffering and restoring energy.

In the usual embodiment of this driving system the electric machine and the heat engine remain coupled constantly together and this power unit works upon the driving axles by means of a clutch conveniently controlled, but this constant coupling of dynamo-motor and engine entails inconveniences due to the particularities of the mixed driving system: A great part of the energy recuperated through the inertia of the vehicle is wasted in the comparatively great power necessary for the light-running of the explosion engine at the maximum speed. Further, from the standpoint of the total efficiency of the driving arrangement it seems advantageous to be able to vary the speed reduction between the electric machine and the heat motor, without influencing the speed regulation of the dynamo, so as to use the explosion motor in a manner corresponding more to the particularities of this engine type.

My invention will meet with these and similar requirements peculiar to mixed driving, by providing a speed relation between the heat motor and the dynamo that is variable in convenient steps between a maximum value, allowing a transmission of the thermal power with the maximum speed of the engine at a certain vehicle speed and a minimum value, permitting the light running with reduced speed, or the stopping of the heat motor, the variation being effected by hand or automatically. The necessity and the moment of passing from one speed ratio to the other may be determined according to the electric state of the battery, or to the profile of the line, or to any other important factor.

In the accompanying drawings—

Figure 2:
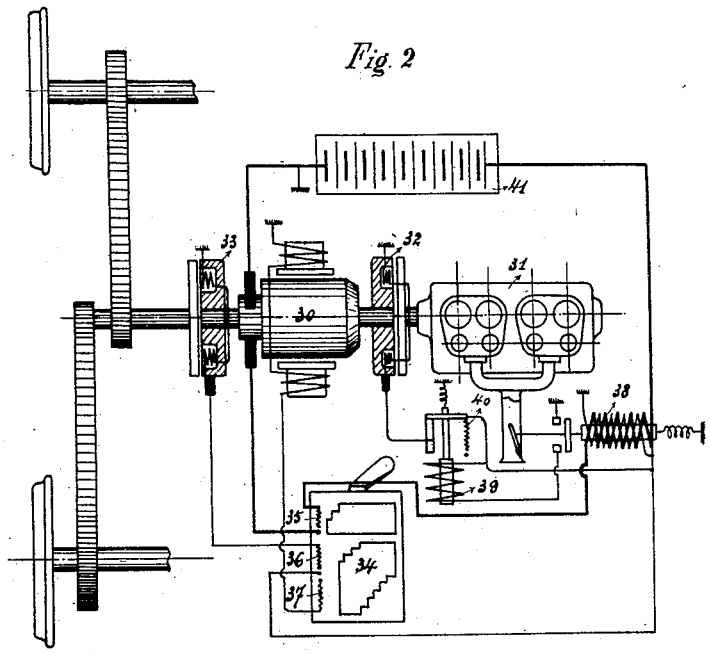
Figure 3:
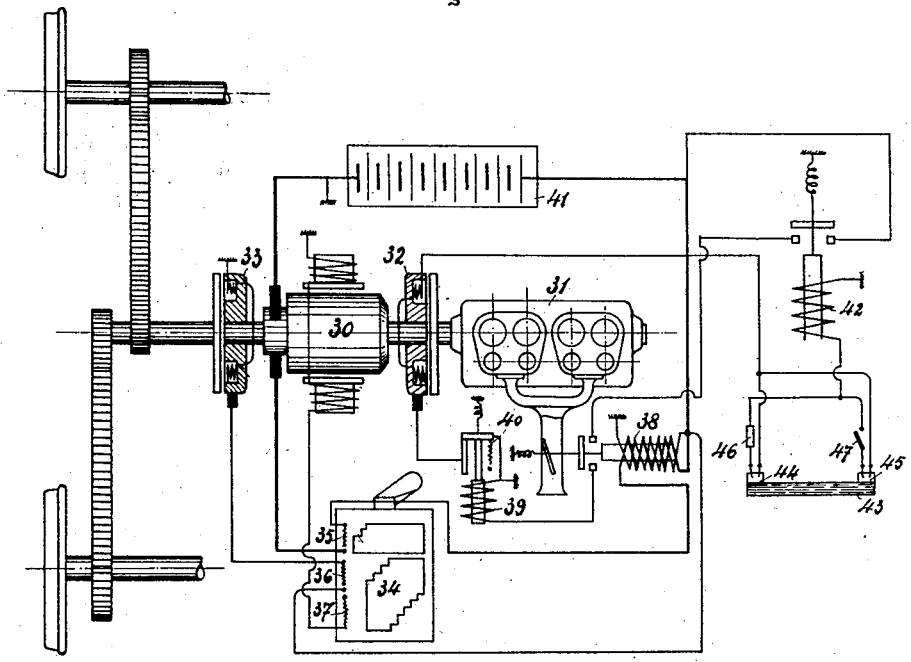

Figure 1 illustrates an embodiment of my invention in the case of operating by hand the varying of the speed ratio between dynamo-motor and heat motor of a mixed system, Figure 2 shows a modification according to which this variation is dependent on the current of the storage battery and Figure 3 represents the case of this variation being dependent simultaneously on the battery state and the line profile.

Referring to Figure 1, the dynamo motor is connected at one end, through interposed gearing, with the driving axle 3 by means of the magnetic clutch 2, while the other end of the dynamo shaft carries two planetary wheels 4, 5 the inner wheel 6 engaging therewith being arranged on the shaft of the explosion engine 7. The outer toothed wheel 8 is arranged to be coupled either with the heat motor 7 by means of the magnetic clutch 9 or with the frame 11 of the vehicle by means of the clutch ring 10. A solenoid 12 serves for regulating the fuel inlet to the thermal engine. The controller comprises the resistance 13 for starting the armature of the electric machine 1 and the resistances 14 and 15 for regulating through the contact 16 the dynamo field and the magnetic clutch 2. The ratio between the wheels 4, 5 and 6 is chosen so that on stopping the outer wheel 8 by the clutch ring 10, the power transmission from the engine to the electric machine takes place with the speed reduction 2:1, while on coupling the outer wheel 8 with the heat motor the speed reduction is 1:1. The clutches 10 and 9 are switched in respectively by means of the contacts 17 and 18 short-circuiting gradually the resistances 19 and 20. The contact 21 and the resistance 22 serve for varying the strength of the solenoid 12. The battery 23 supplies the current to the different electric circuits.

The arrangement shown in Figure 1 works in the following manner: Firstly, the heat motor and the electric machine are coupled together by means of the clutch 10 permitting a great speed of the engine in the case of a small speed of the vehicle, the speed ratio being 2:1 in this case. To this end the controller drum containing the contacts 17, 18, 21 is brought into position I. Now, the main clutch 2 as well as the dynamo motor 1 and engine 7, is switched in and the vehicle is started up by means of the controller drum 16 containing the contact in the known manner. At a certain moment of the electric speed regulation, for instance when the controller 16 is in position X, which is indicated to the watchman by a corresponding value of the discharge current being read off the amperemeter, the changing over from the one to the other speed ratio will be advisable, which is effected by moving the drum containing the contacts 17, 18, 21 into position II so that the speed reduction between engine and dynamo-motor is 1:1.

If a recuperation of energy takes place, for instance on descending inclines, both the clutches 8 and 10 can be switched out by bringing the controller drum carrying the contacts 17, 18, 21 into position III. At the same time, the gas admission is reduced, the contact 21 short-circuiting the resistances 22 regulating the current of the solenoid 12. Consequently the heat motor runs idly without transmitting power at a speed reduced for instance to a tenth of the maximum.

Further, more than two speed ratios may be provided, especially for the period of power transmission of the heat motor. Finally, the varying of the speed ratio may be effected so as to apply, for instance on ascending hills, during the whole speed regulation period, while in the case of the necessary driving power decreasing, for instance on running on level the speed ratio 1:1 is employed, the heat motor running preferably at reduced speed and fuel admission.

Figure 2 illustrates an embodiment of the invention in which the varying of the speed ratio is dependent on the battery current. A magnetic clutch 32 is inserted between the dynamo-motor 30 and the internal combustion engine 31, while the magnetic clutch 33 serves for connecting the dynamo motor and engine with the driving axles. The controller 34 comprises the resistances 35, 36, 37, serving respectively for starting of the armature, regulating the field of the electric machine and switching in the clutch 33. The clutch 32 is controlled by a differential relay 38 which is dependent on the tension and the intensity of the battery current, so as to close, when excited by a charge current of a certain value the circuit of the solenoid 39, which cuts off the magnetic clutch 32 through the resistances 40. At the same time, the magnet 38, which is responsive to the differential action of the series and shunt coils acts in a well known manner upon the gas admission of the heat motor by opening or closing the gas inlet according to the actual discharge or charge current of the buffer battery 41.

The vehicle shown in Figure 2 works in the following manner: On starting the controller 34 switches in the armature through the resistance 35 and the field winding of the electric machine 30 through the resistance 37. The armature taking discharge current from the battery 41, the core of the differential magnet 38 keeps the circuit of the solenoid 39 open. Consequently, the circuit of the clutch 32 is closed at 40 and the heat engine 31 is coupled to the electric machine 30. At the same time the circuit of the main clutch 33 is closed by means of the contact 34 and the resistance 36 so that the power set 30, 31 is connected to the wheels. The controller 34, on its further movement, puts in the resistances 37 diminishing the excitation of the electric machine and thereby increasing the speed of the power set and the vehicle up to the maximum. The differential relay 38 is influenced by the current and the tension of the battery so as to keep open the circuit of the solenoid 39 and the gas admission of the engine 31 as long as the electric machine 30 takes current from the battery. But it closes its contacts and causes the exitation of the solenoid 39 as soon as a charge current of a certain value is produced by the electric machine, the excited solenoid 39 then opening the circuit of the clutch 32 so as to disconnect the engine 31 from the electric machine 30.

Generally, the internal combustion engine will be coupled constantly to the dynamo motor on ascending inclines and on starting so as to transmit power to the driving wheels with the speed ratio for instance of 1:1 but it is disconnected from the electric machine automatically in the case of an energy being restored up in the battery by the dynamo on descending hills and on stopping above preferably after the charge current having attained a certain small value necessary for compensating the electric losses. Simultaneously with the opening of the clutch 32 the fuel admission to the engine 31 is cut off by the magnet 38 in a manner that the same runs now without load at a reduced speed or is stopped. When the vehicle requires again driving power so as to provoke a discharge of the battery, for instance on starting, the relay 38 closes again the clutch 32 by cutting off the circuit of the solenoid 39 and re-opens at the same time completely the gas admission to the engine. Consequently the thermal and the electric engine are coupled again together so as to furnish power as a single unity to the wheels.

As it is clear from the foregoing description, a driving system according to my invention permits to obtain an efficient recuperation of the energy given through the inertia of the vehicle mass on descending inclines or on stopping. A large proportion of this mechanical energy is re-transformed in electrical energy stored up in the battery, because the loss of the energy is avoided which is otherwise due to the necessity of driving the explosion engine running without load at a great speed. The disconnecting of the heat motor takes place without any inconvenience as regards the quiet running of the vehicle, the electric machine constituting a power being constantly coupled to the wheels during the driving period so as to prevent a shock at the moment of disconnecting the heat motor from the wheels. Further the fuel consumption required by the explosion engine for light running is exceedingly small so as not to represent practically a loss.

Of course, if it is desired the separate disconnecting of the heat motor may be executed at the moment of the discharge current falling below a certain value or becoming zero, for instance on running on the level. Further, the switching in and out of the clutch inserted between the two machines may be effected by the driver regulating by hand the speed ratio between dynamo-motor and heat engine. The possibility of disconnecting the explosion engine from the electric machine is advantageous also in the case where for any reason the heat motor ceases to supply power, so that the electric machine alone has to drive the vehicle.

Figure 3 shows an embodiment of the invention, in which the varying of the speed ratio is dependent simultaneously on the profile of the line and on the current of the battery. Besides the equipment already shown in Figure 2, there is a second relay 42 controlling the circuit of the solenoid 39. This relay 42 is excited so as to close its contacts as soon as the mercury interrupting device 43, which takes always the same inclination as that of the vehicle frame closes the contacts 44 or 45 respectively according to the sense of running in the case of descending inclines of a certain angle. If, at the same time, the battery current attains a fixed amount, the relay 38 closes also its contacts. Consequently, the circuit of the solenoid 39 is completely closed and the disconnection of the clutch 32 takes place. Preferably, the heat motor is then brought to a reduced speed or to standstill by regulating suitably the fuel inlet. The one of the two contact pairs 44 and 45 is always rendered inoperative by opening respectively the one or the other of the switches 46 and 47 according to the sense of running of the vehicle.

Having thus described my invention, I declare what I claim as new and desire to secure by Letters Patent is:

1. A driving system for self-propelled vehicles comprising in combination a dynamo electric machine, a battery connected thereto, a clutch coupling said electric machine to the wheels, an internal combustion engine, an adjustable clutch inserted between said engine and said electric machine and enabling said engine to work without load at a conveniently reduced speed, means for controlling the speed of said electric machine, an automatic device dependent on the voltage and the strength of the battery current and controlling said adjustable clutch, and automatic means for varying the gas admission to said engine dependent upon the electric state of the battery.

2. A driving system for self-propelled vehicles comprising in combination a dynamo electric machine, a battery connected thereto, a clutch coupling said electric machine to the wheels, an internal combustion engine, an adjustable clutch inserted between said engine and said electric machine, means for controlling the speed of said electric machine, an automatic device dependent on the gradient and controlling said adjustable clutch, and automatic means for reducing the speed of said engine up to standstill.

3. A driving system for self-propelled vehicles comprising in combination a dynamo electric machine, a battery connected thereto, a clutch coupling said electric machine to the wheels, an internal combustion engine, an adjustable clutch inserted between said two machines and allowing said engine to transmit power to the wheels or to work without load at a conveniently reduced speed respectively, an automatic device dependent upon the electric state of the battery and the gradient and controlling said adjustable clutch, and means for varying the gas admission to said engine dependent upon the amperage and the voltage of the battery current.

4. A driving system for self-propelled vehicles comprising in combination an internal combustion engine, a dynamo electric machine, a battery connected to the latter, a clutch coupling said electric machine to the wheels, an adjustable clutch inserted between said two machines, a controller for regulating the speed of said electric machine, an automatic device for varying the gas admission of said engine dependent upon the battery charging current, and automatic means controlling said adjustable clutch so as to cut off said engine from said electric machine, in the event of the charging current exceeding a certain value, and to reestablish the coupling if the charging current sinks below this value.

5. A driving system for self-propelled vehicles comprising in combination a dynamo electric machine coupled to the wheels, a battery connected to said electric machine, an internal combustion engine, means for coupling or disconnecting respectively said engine and said electric machine, a controller for regulating the speed of said electric machine, an automatic device dependent upon the electric state of the battery and varying the gas admission to said engine, and automatic means controlling said coupling means dependent upon the gradient so as to disconnect said engine only on descending inclines of an angle exceeding a certain value.

6. A driving system comprising in combination a dynamo electric machine, a battery connected thereto, an electromagnetic clutch coupling said electric machine to the wheels, a controller for regulating said clutch and for varying the speed of said electric machine, an internal combustion engine, an automatic device dependent upon the electric state of the battery and regulating the gas admission to said engine, an adjustable clutch inserted between said two machines and enabling said engine to transmit power to the wheels or to work without load at reduced speed respectively, automatic means dependent on the amperage and the voltage of the battery current and on the gradient and controlling said adjustable clutch so as to disconnect said engine from said electric machine in the event of the battery current and the gradient of the line each attaining a certain fixed value and to maintain the coupling whenever these two conditions are not fulfilled at the same time.

In testimony whereof I affix my signature in presence of two witnesses.

HENRI PIEPER.

Witnesses:
 EM. HEPLIN,
 A. DEMEURE.